US007506272B2

(12) United States Patent
Kopitzke et al.

(10) Patent No.: US 7,506,272 B2
(45) Date of Patent: *Mar. 17, 2009

(54) METHOD OF MONITORING AIRCRAFT CABIN SYSTEMS

(75) Inventors: Kirsten Kopitzke, Hamburg (DE); Martin Frey, Hamburg (DE); Joerg Holst, Wulmstorf (DE); Christian Riedel, Bliedersdorf (DE)

(73) Assignee: Airbus Deutschland GmbH, Hamburg (DE)

( * ) Notice: Subject to any disclaimer, the term of this patent is extended or adjusted under 35 U.S.C. 154(b) by 977 days.

This patent is subject to a terminal disclaimer.

(21) Appl. No.: 10/713,224

(22) Filed: Nov. 17, 2003

(65) Prior Publication Data

US 2004/0119748 A1   Jun. 24, 2004

Related U.S. Application Data

(63) Continuation of application No. 09/871,032, filed on May 31, 2001, now Pat. No. 6,988,246.

(30) Foreign Application Priority Data

May 31, 2000   (DE) ................. 100 26 788
Jan. 4, 2001   (DE) ................. 101 00 273

(51) Int. Cl.
*G06F 3/048*   (2006.01)
*G06F 3/00*    (2006.01)

(52) U.S. Cl. ............... 715/810; 715/970; 700/277

(58) Field of Classification Search .......... 715/702, 715/810, 970, 830; 700/276, 277, 210; 244/118.5; 340/945

See application file for complete search history.

(56) References Cited

U.S. PATENT DOCUMENTS

| | | | | |
|---|---|---|---|---|
| 5,086,385 A | * | 2/1992 | Launey et al. | 700/83 |
| 5,555,502 A | * | 9/1996 | Opel | 701/36 |
| 5,677,603 A | * | 10/1997 | Speirs et al. | 315/324 |
| 6,346,892 B1 | * | 2/2002 | DeMers et al. | 340/945 |
| 6,424,337 B1 | * | 7/2002 | Eriksson et al. | 345/163 |
| 2002/0015063 A1 | | 2/2002 | Kopitzke et al. | |
| 2002/0016639 A1 | * | 2/2002 | Smith et al. | 700/9 |

OTHER PUBLICATIONS

Elo Graphics, "history of Elo", from http://www.elotouch.com/AboutElo/History/default.asp.*

* cited by examiner

*Primary Examiner*—Dennis G. Bonshock
(74) *Attorney, Agent, or Firm*—Oblon, Spivak, McClelland, Maier & Neustadt, P.C.

(57) ABSTRACT

A method of monitoring and controlling aircraft cabin systems using a user interface having a touch sensitive display and a plurality of input keys corresponding to the systems. One of the input keys corresponding to a first aircraft cabin system is activated to display a first system graphical menu having status information and operating functions of the first system, and a touch sensitive input area of the first system graphical menu is touched to perform selection or control of the first system. Another one of the input keys corresponding to a second aircraft cabin system can be activated to display a second system graphical menu having status information and operating functions of the second system, and a touch sensitive input area of the second system graphical menu can be touched to perform selection and control of the second system.

20 Claims, 9 Drawing Sheets

METHOD OF MONITORING AIRCRAFT CABIN SYSTEMS

REFERENCE TO RELATED APPLICATIONS

This application is based on and claims priority to U.S. patent application Ser. No. 09/871,032, which claims priority to German Patent Application No. 10026788.2 filed May 31, 2000, and German Patent Application No. 10100273.4, filed Jan. 4, 2001. The entire content of each of these applications is incorporated herein by reference.

BACKGROUND OF THE INVENTION

1. Field of the Invention

The invention relates to an apparatus for controlling and monitoring aircraft cabin systems, for example the functions of the information, audio, video, lighting, door, water supply, or wastewater systems, and further relates to a method for operating the apparatus.

2. Discussion of the Background

The operation and status of present day aircraft cabin systems are typically controlled and monitored from operating devices having simple input key panels and relatively small liquid crystal displays. With such operating devices, the functionality of the display and of the input keys is quite limited, or even strictly fixed to a respective single assigned function. In other words, there is little or no flexibility or adaptability of the present day conventional operating devices to accommodate changes of the respective cabin systems that are to be controlled or monitored. Therefore, the technical possibilities with regard to the expansion, flexibility, and adaptation to the most modem technologies are completely exhausted. There is a need to provide a more versatile, adaptable, user-friendly, and intuitively operable device for monitoring and controlling aircraft cabin systems.

SUMMARY OF THE INVENTION

In view of the above, it is an object of the invention to provide a device or arrangement of the above mentioned general type, which can be adapted to various prescribed requirements existing in any given application, for controlling and monitoring a variety of aircraft cabin systems from a single compact input and display arrangement. It is another object of the invention to provide a method for operating such a control and monitoring arrangement, which is user-friendly, intuitive, adaptable and reprogrammable to accommodate variations of the systems to be controlled and monitored. The invention further aims to avoid or overcome the disadvantages of the prior art, and to achieve additional advantages, as apparent from the present specification.

The above objects have been achieved according to the invention in a flight attendant operating device in the form of an input and display arrangement or interface panel comprising a liquid crystal display screen and a touch sensitive surface input arrangement. The liquid crystal display screen comprises a basic layout including a general display area as well as touch sensitive input keys embodied or provided with respective system and function symbols respectively associated with these input keys. The symbols may be words, letters, graphical icons, or any other identifying indicia. At least two system menus, which are respectively associated with two respective cabin systems, are provided as subordinate to the basic layout and can be displayed selectively on the general display area of the basic layout for selecting, controlling and monitoring the functions of the respective associated cabin system. As such, the respective individual system menus each operate as a system-specific window that can be selectively brought up in the display area of the basic layout. The system menus are thus virtual menus that may include virtual display areas and/or virtual input areas, and that may be selectively brought up and displayed in the display area of the basic layout.

All of the various menus or other features that are to be displayed in the display area of the basic layout can be generated, selected, arranged, and manipulated in any conventionally known manner by means of appropriate software and/or hardware, operating in the context of a computer system, which may be the general aircraft computer system, or a portion thereof, or a separate cabin system control computer. In response to the user inputs received from the inventive device, the computer then sends corresponding control command signals to the respective cabin systems to effectuate the desired control functions in any known manner.

According to further detailed embodiments, the invention provides for a main menu that can be displayed on the display area of the basic layout and that indicates the cabin status, i.e. the status of various systems or components within the cabin. Thereby, the main menu is provided or hierarchically arranged between the basic layout and the system menus. The main menu displays the essential information regarding the various cabin systems so that one or more of the cabin systems may be selected from a menu page of the main menu. The invention further preferably provides that the basic layout additionally includes, across the top of the basic layout, a header line or bar that identifies the respective active menu.

The above objects have further been achieved according to the invention in a method of operating the above described arrangement, including the following steps: p0 a) an operator or user such as a flight attendant first touches or presses a desired system symbol on the basic layout or on the main menu so as to select and call up the respective associated main menu or subordinate system menu;

b) as a result, the selected main menu or system menu will be displayed on the general display area of the liquid crystal display screen; and c) the operator then touches or presses respective pertinent function symbols displayed on the selected main menu or system menu, whereby these function symbols are respectively associated with prescribed operating functions of the pertinent selected system, in order to thereby select and/or adjust the desired operating functions of the respective associated selected cabin system.

The invention thus provides an apparatus whereby the flight attendant operating device may advantageously be universally adapted to various different respective requirements, by making use of touch sensitive screen technology. In other words, the display area of the basic layout is embodied as a touch sensitive screen, and can have various menus or windows displayed selectively thereon. The input keys of any system menu are essentially virtual input keys that can be displayed as needed for the various subsystems in the display area of the basic layout. Respective touch sensitive areas of the touch sensitive screen respectively in registration with the virtual displayed input keys will receive the touch inputs of the user.

Thereby, any given portion or area of the basic layout is not strictly dedicated to a particular function, but instead the display and input functions can be variably indicated or arranged on the basic layout as needed. Moreover, a required change of the display and/or input functions to accommodate a change or difference in the respective aircraft cabin systems can be achieved by simply reprogramming the software that generates the various displays and input functions. Such universal adaptability is directly linked to the required flexibility. Furthermore, the inventive arrangement provides a single, compact, versatile operator interface that makes it possible to control and monitor all of the relevant aircraft cabin systems from this single compact unit.

The inventive operating device or operator interface provides the following advantages:

a) easy user recognition of known functions and processes or sequences;
b) intuitively correct user inputs without requiring specialized training;
c) the possibility of reallocation and reuse of the same individual elements such as input keys, symbols, display fields, etc. to various different systems and/or functions;
d) by using a color display screen, it becomes possible to maintain a consistent color scheme or philosophy, i.e. using the same colors universally in connection with the same purpose, condition, status, or result to be achieved;
e) the display properties of the device can be adjusted or adapted to maintain good visibility under varying lighting conditions within the aircraft cabin; and
f) use of the fewest possible submenu planes for achieving a relatively flat hierarchy of the sub-menus or sub-windows.

BRIEF DESCRIPTION OF THE DRAWINGS

In order that the invention may be clearly understood, it will now be described in connection with an example embodiment, with reference to the accompanying drawings, wherein.

DESCRIPTION OF THE PREFERRED EMBODIMENTS

Figure 1:
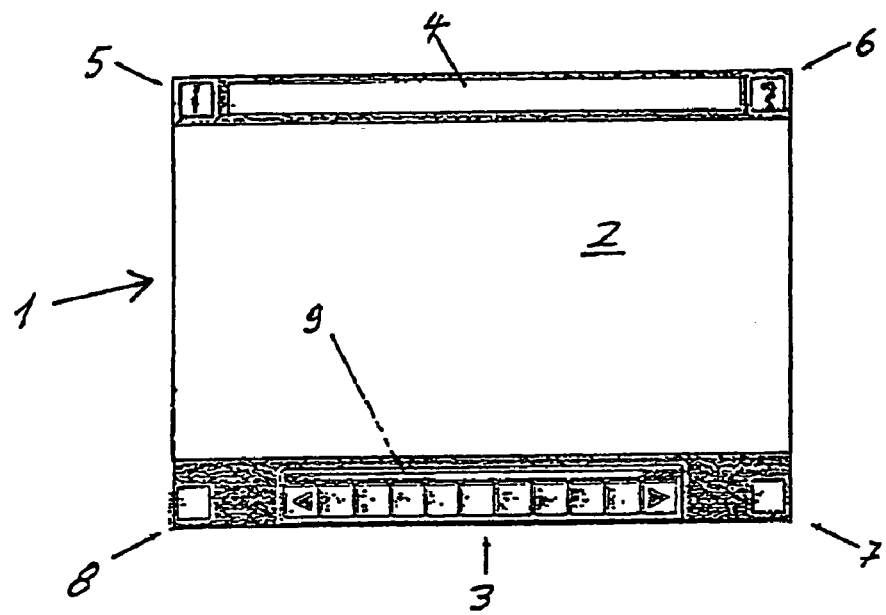
FIG. 1 schematically shows the basic layout of an operating device according to the invention, including a liquid crystal display screen and a touch sensitive surface input arrangement.

FIG. 1 schematically shows the basic layout 1 of the operator surface or user interface of a flight attendant operating device, comprising a liquid crystal display screen in combination with a touch sensitive surface input arrangement, for example embodied together as a touch sensitive screen. The basic layout 1 is preferably divided into three parts or areas. Namely, the basic layout 1 comprises a general display area 2, pressure sensitive or touch sensitive input keys 3 respectively provided with system and functional symbols, and a header line or bar 4 for identifying the respective active menu. The available menus, which can be selected and displayed individually or together in any conventionally known single window or multiple window format, include a main menu 10 (see FIG. 2) and at least two or more system menus 11 to 19 (see FIG. 2). The selected menu is respectively displayed on the general display area 2 of the basic layout 1.

The main menu 10 displays the cabin status and the respective essential information or data regarding the various cabin systems so that a respective desired one of the cabin systems can be selected on a menu page of the main menu 10, for example by simply touching the touch sensitive screen in an area corresponding to the display of the respective cabin system information or symbols, or by touching one of the touch input keys 3 that is associated with that system. Once a respective one of the cabin systems is selected, the respective associated system menu will be displayed on the general display area 2 of the basic layout 1. The several system menus 11 to 19 are each respectively adapted for selecting, controlling and monitoring the functions of the respective associated cabin system. Thereby, the respective system menu is subordinate to the basic layout 1 and is displayed on the display area 2 when it is selected. Advantageously, the touch input keys 3 of the basic layout 1 are accessible and usable for an operator of the device regardless of the particular menu being displayed, i.e. for each display of a respective menu on the display area 2.

As can also be seen in FIG. 1, the device further includes, incorporated in the basic layout 1, an information key 5, a help key or button 6, a key or switch 7 for directly calling up the main menu regardless of the presently active state of the display area 2, and a locking switch or key 8 for switching off and/or locking the display screen. Particularly, from any screen or menu or display, the information key 5 will provide context-sensitive further information for the operator of the apparatus, while the help key 6 will provide context-sensitive operating instructions and further help for operating the apparatus. For example, if the lighting system menu 12 is being displayed, the information key 5 would provide further detailed technical information, status information and the like regarding the various lighting system components, while the help key 6 would provide instructions or guidance as to the appropriate lighting selections and how to enter the desired lighting selections in the context of the lighting system menu 12.

A scroll bar 9 is arranged above the keys 3 for the system and function symbols, whereby this scroll bar 9 shows an operator of the device that further menu sets are available. Preferably, the length of the elements of the scroll bar 9 approximately indicate the number of the subsequent menu sets. By operating the scroll bar, the successive available menu sets can be scrolled through, for example by scrolling the respective associated virtual labels or indications of the system or functional symbols indicated on the respective touch sensitive keys 3. This is achieved, for example, by touching the scrolling arrow keys at the two ends of the strip of touch sensitive input keys 3.

Figure 2:
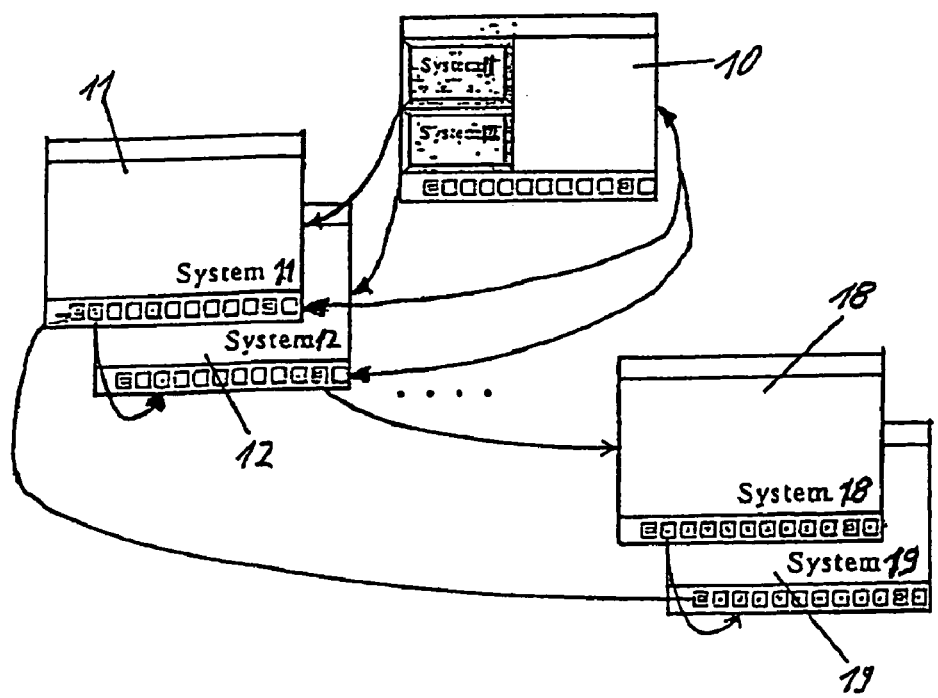
FIG. 2 is a schematic diagram representing the interrelationships of the menu structure of the main menu and several subordinate system menus.

The menu structure represented in FIG. 2 shows the main menu 10 and several subordinate system menus 11 to 19. The main menu key 7 for calling up the main menu, the system and function symbol keys 3 and the header line 4 of the basic layout 1 will be maintained on the basic layout 1 during and regardless of the call-up and display of any selected one of the several menus in the display area 2. This is schematically indicated in that these elements are consistently shown in each one of the illustrated menus 11 to 19. The main menu 10 is conceptually arranged between the basic layout 1 and the several system menus 11 to 19, whereby any desired one of the system menus 11 to 19 can be selected and called up by an operator by manually touching the touch input keys 3 provided with the corresponding system and function symbols, or simply by touching the depiction of a corresponding system icon or symbol on the active main menu 10 being displayed on the touch sensitive general display area 2 of the basic layout 1. As an alternative, the system menus 11 to 19 can be automatically successively called up and displayed in the display area 2 of the basic layout 1, for example according to a prescribed succession plan or display sequence.

The linkages between the several system menus and the main menu are illustrated by corresponding arrows in FIG. 2. For example, from any system screen being displayed in the display area 2 of the basic layout 1, the operator can return directly to the main menu 10 by pressing the main menu key 7, also called the cabin status key 7. Similarly, from any displayed menu, the operator can directly select a different desired system menu by pressing the corresponding touch input key 3 labeled with the appropriate corresponding system symbol or label. The scroll arrow touch input keys will, for example, scroll to the next successive or the previous system menu. In any event, once the selected main menu or system menu is displayed on the display area 2 of the basic layout 1, the touch sensitive display screen becomes active with the appropriate touch sensitive input areas associated with the respective displayed menu. Thereby, the operator can select or control desired operating conditions of the respective displayed cabin system associated with the selected one of the system menus 11 to 19 by simply touching the appropriate corresponding function symbols being displayed on the associated menu on the display area 2 of the basic layout 1.

Further details of the individual menus respectively shown in FIGS. 4 to 10 will be discussed below. In the context of the following discussion, several advantages of the invention will become apparent. The invention allows a reduction of the number of individual or separate operating devices. Namely, a single operating device is provided for monitoring and controlling all of the pertinent cabin systems. This in turn leads to a weight and cost reduction, savings with regard to the costs and effort needed for installation and cable connections, and makes simplified networking of the device possible. The inventive apparatus fulfills the specifications and other requirements for the control and monitoring of aircraft cabin systems especially in the newest high capacity aircraft, for example in connection with a complex lighting control or climate control, as well as providing an open interface for server applications and software download capabilities. The inventive apparatus can be readily adapted to accommodate the requirements of various customers of the aircraft manufacturer, i.e. the various airlines purchasing the aircraft. This is especially true because essentially all of the adaptations can be achieved simply by changes of the software and/or parameters in the cabin allocation or assignment module. An adaptation of the hardware (devices or accessories) is no longer necessary. All expansions and provision of new functions can be achieved simply by updating the software and/or the parameters in the cabin allocation or assignment module. It is therefore also possible that each customer airline can carry through its own individual company identity with special functions, options, displays, logos, messages, color schemes, or the like.

Figure 3:
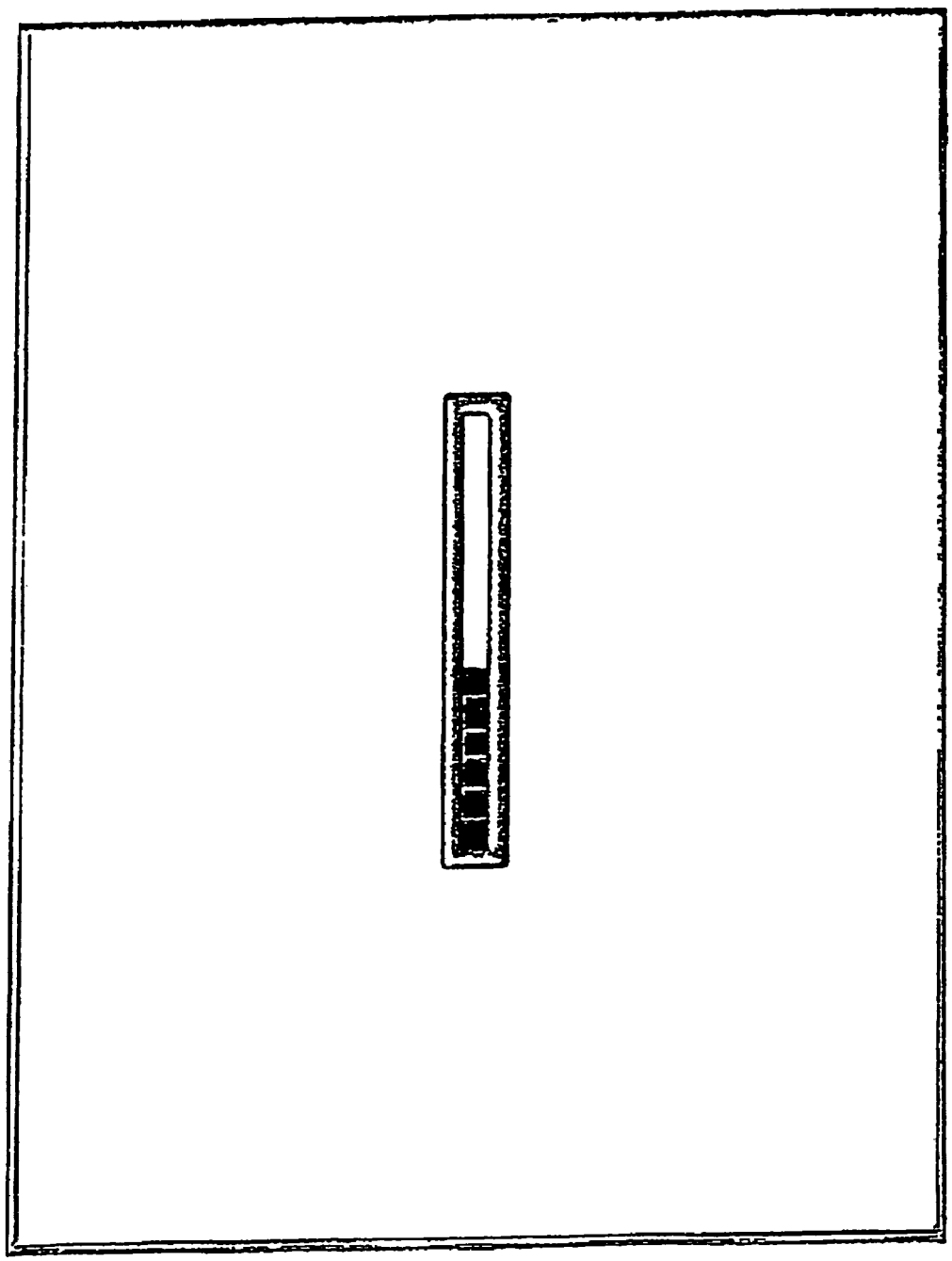
FIG. 3 schematically shows the appearance of the arrangement during a booting phase.

The simple schematic view of FIG. 3 represents the appearance of the overall apparatus or device during booting up of the overall system software, as shown with a so-called progress bar showing the progress of the boot-up procedure, for example. Note that the liquid crystal display screen is otherwise blank or empty. This demonstrates the preferred embodiment in which the entire user interface is embodied as a versatile, adaptable touch sensitive display screen, on which all of the touch input keys, display areas and the like are virtually generated and displayed as necessary for the particular situation. None of the input keys needs to be a permanent hard-wired element. After completion of the boot-up process, preferably the main menu 10 shown in FIG. 4 will be displayed on the general display area 2 of the basic layout 1.

Figure 4:
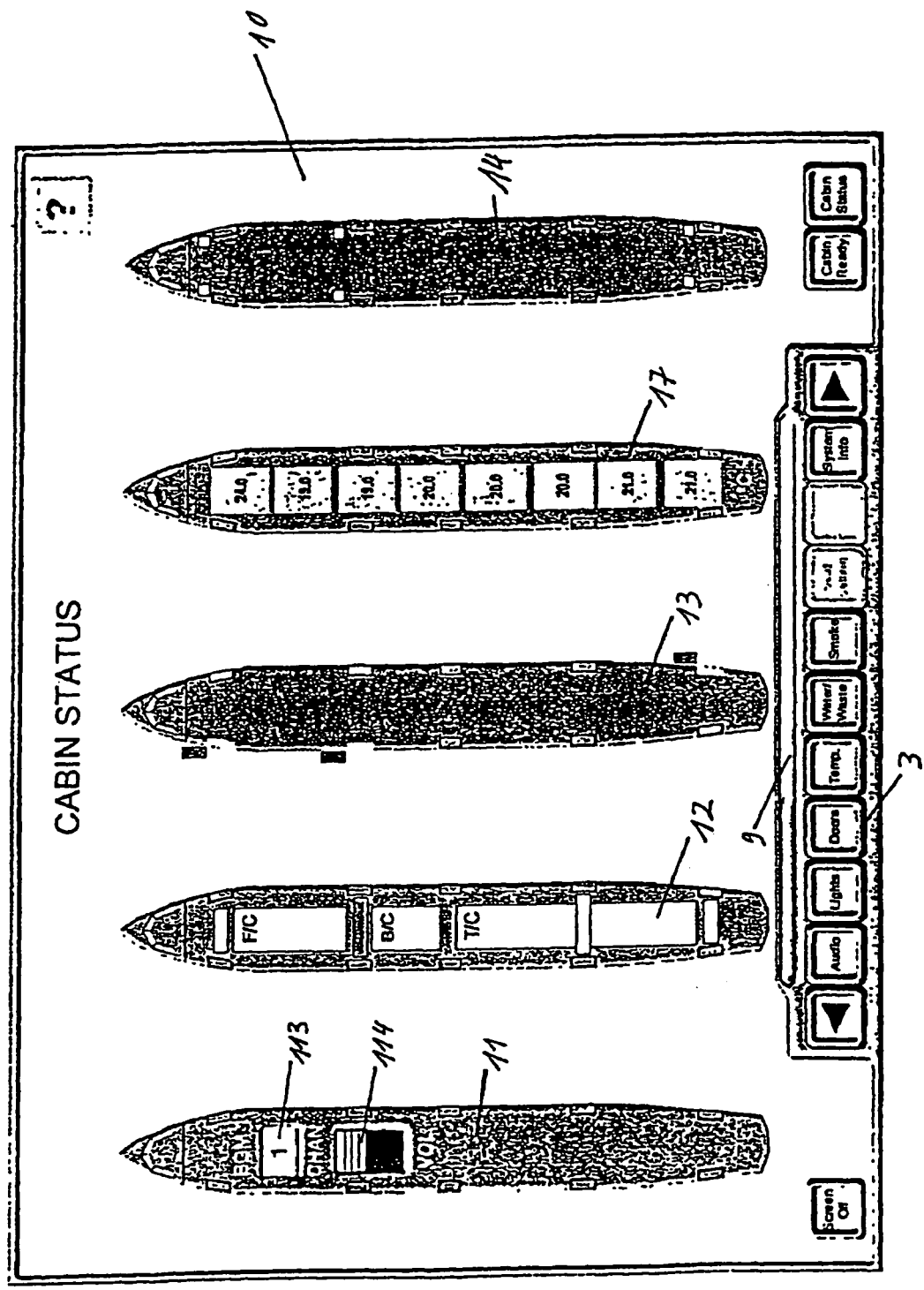
FIG. 4 schematically shows the main menu with five graphically displayed examples of subordinate cabin systems that can be selected.

As shown in FIG. 4, the main menu 10 provides a general overview of the overall cabin status and includes the essential information or data regarding the various cabin systems to allow the desired pertinent cabin system to be selected. For example, the main menu 10 shows the cabin status of five different cabin systems relating to the system menus 11 to 15, namely for the cabin audio system 11, the cabin lighting system 12, the aircraft doors 13, the water supply and wastewater system 14, and the temperature or air-conditioning system 17. These several systems are respectively displayed with a corresponding graphical display of the relevant aspects of the cabin layout on the display area 2, and from there the respective corresponding system menus can be directly selected and called-up by means of the touch sensitive screen technology, namely by simply touching the area of the display screen 2 on which the selected system image is displayed.

Figure 5:
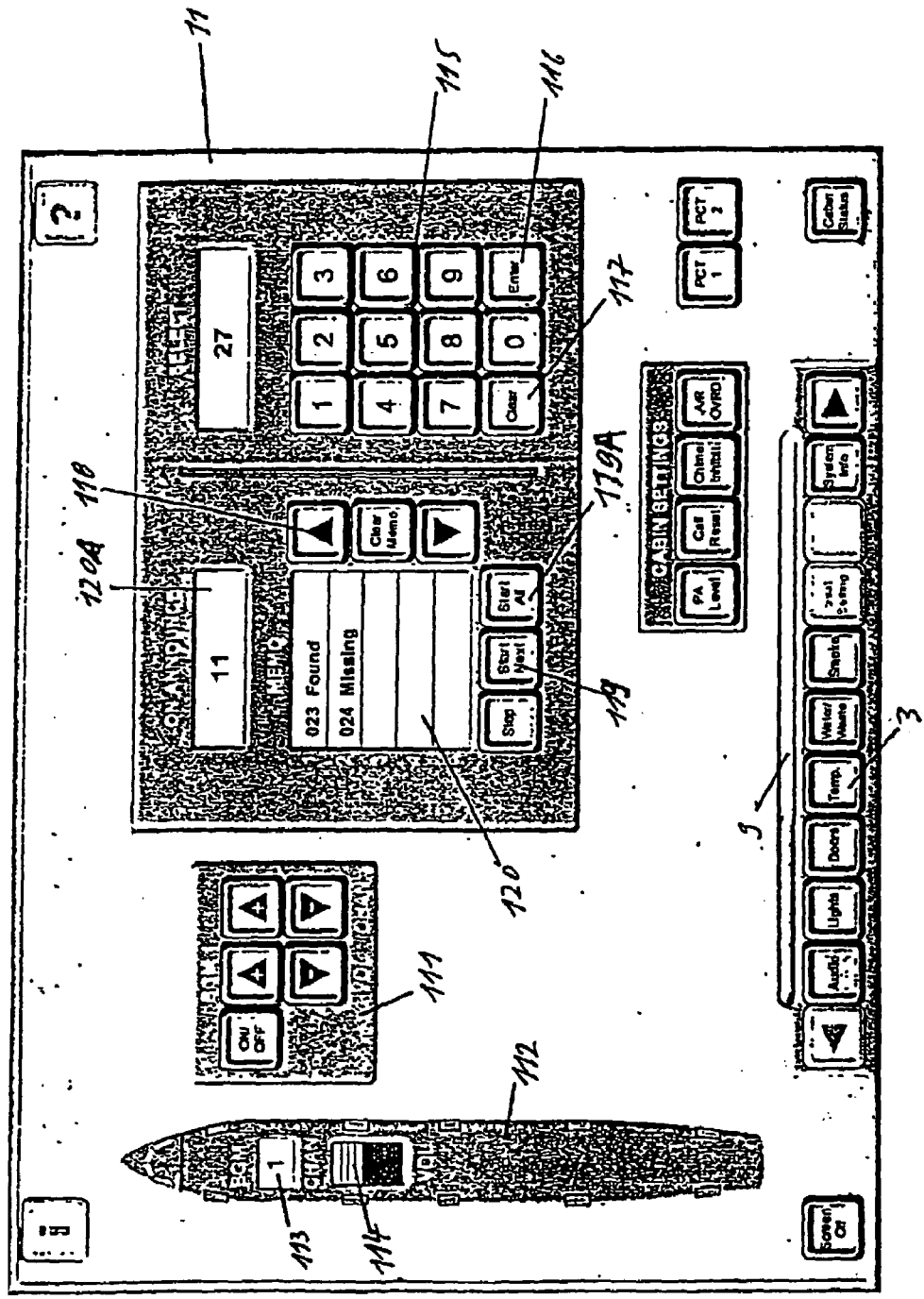
FIG. 5 schematically shows a system menu associated with an audio system of the aircraft.

The system menu 11 shown in FIG. 5 is for controlling and monitoring the aircraft cabin audio system, namely with respect to selecting and playing previously recorded announcements as well as adjusting or selecting the on-board music channel. In this context, selection of the music channel and the volume is carried out by means of the respective corresponding +/− keys 111 in a virtual keyboard grouping on the left side of the system menu 11. The currently existing status of these adjustments, i.e. the actually selected music channel and volume, is respectively indicated in corresponding display fields, namely a channel indicator 113 and a volume indicator 114 within a graphical aircraft symbol 112.

On the other hand, passenger information and instruction announcements can be selected in a virtual display and keypad screen on the right side of the system menu 11, for example through selection or input of the corresponding associated number of the announcement via the numerical key pad 115. Then, by pressing the enter key 116, the presently entered announcement number may be confirmed and selected, while on the other hand the clear key 117 may be touched in order to erase or clear the entered number. The arrow keys 118 can be used to scroll through the available recorded announcements in order to find one or more desired announcements in a targeted manner, to be queued in a view window or memo window 120. The start key 119 can then be used to play the next selected announcement, while the clear key 117 can be used to clear the preselection. The "start-all" key 119A can be touched to begin a sequential playing of all of the selected or stored announcements, while the list or sequence of stored announcements to be played is indicated in the memo window 120, and the number of the currently playing announcement is displayed in the indicator field 120A above the memo window 120. In order to interrupt the playing of the announcement or announcements, a stop key is also provided.

Additional functions pertinent to the audio system can also be displayed and selected via virtual displays and keys, for example to adjust the PA level, to reset the call buttons, to inhibit call chimes, or the like. This is merely an example demonstration of various different functions and features that can be displayed and selected based on the needs of the individual application, simply by appropriate program adjustments.

Figure 6:
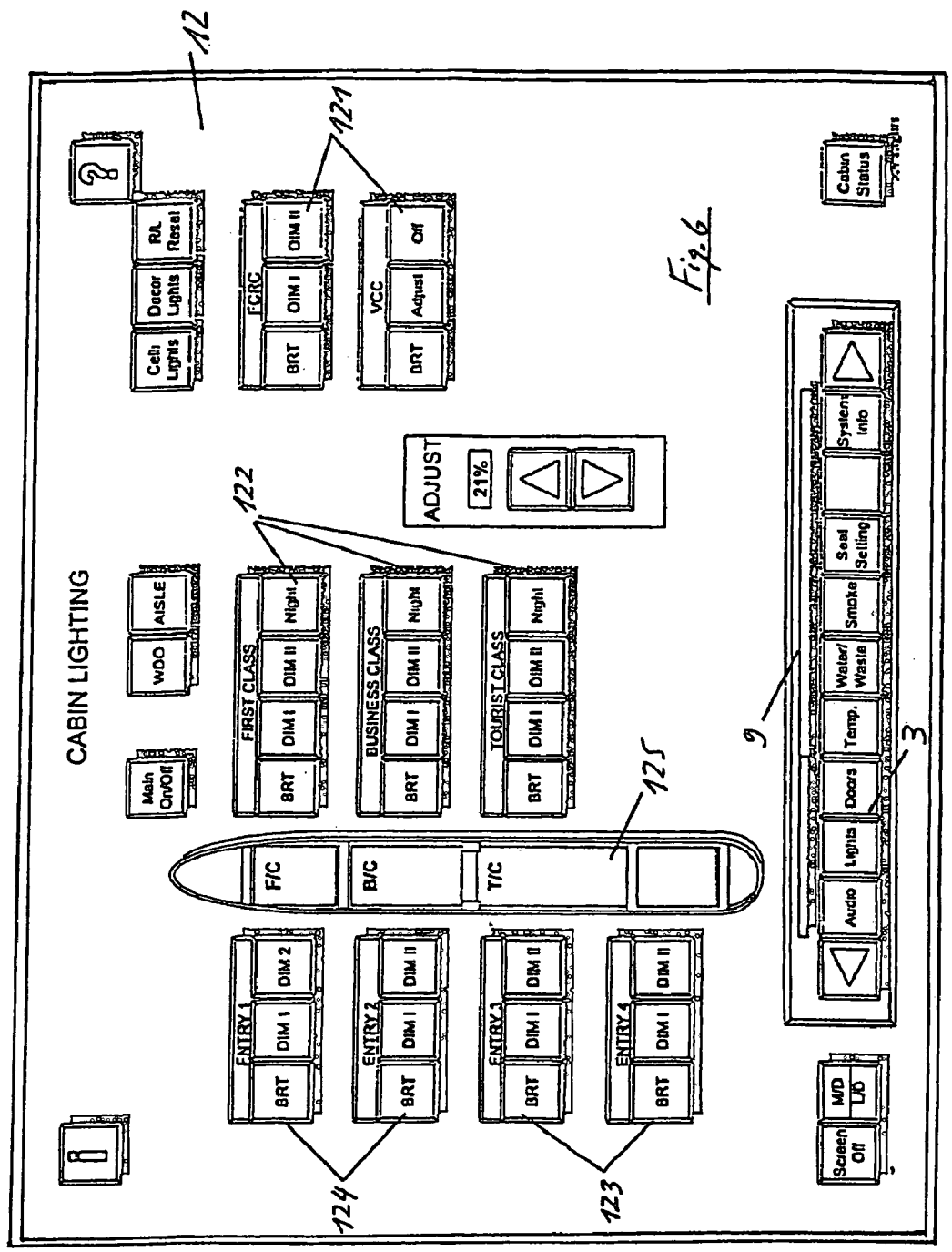
FIG. 6 schematically shows a system menu associated with a lighting system of the aircraft.

The system menu 12 shown in FIG. 6 controls the cabin lighting system in the aircraft cabin. For example, this cabin lighting system can include separate lighting arrangements for the door entry zones, separate cabin zones, and/or individual independent partitioned areas, spaces or cabins within the aircraft, which may all be individually controlled and monitored from the system menu 12. In this regard, the system menu 12 includes several sets or groups of touch input keys 121, 122, 123 and 124, which each allow selection or adjustment of the desired lighting brightness level in respective different cabin areas. Preferably, in the cabin entry zones, any desired one of three brightness steps, namely bright or full illumination, dimming stage 1, and dimming stage 2 can be selected. The current, actually selected lighting adjustments are displayed in a graphical aircraft symbol 125, which is advantageously divided into the various lighting zones. Various other display features and/or input keys can be provided on the screen display of this system menu 12, as needed for any particular application. For example, a fine-tuned brightness or dimness adjustment is possible by selecting a particular percentage of the maximum full brightness with corresponding arrow scroll keys. The functions of the other exemplary keys shown in FIG. 6 are self-explanatory in the context of aircraft cabin lighting systems.

Figure 7:
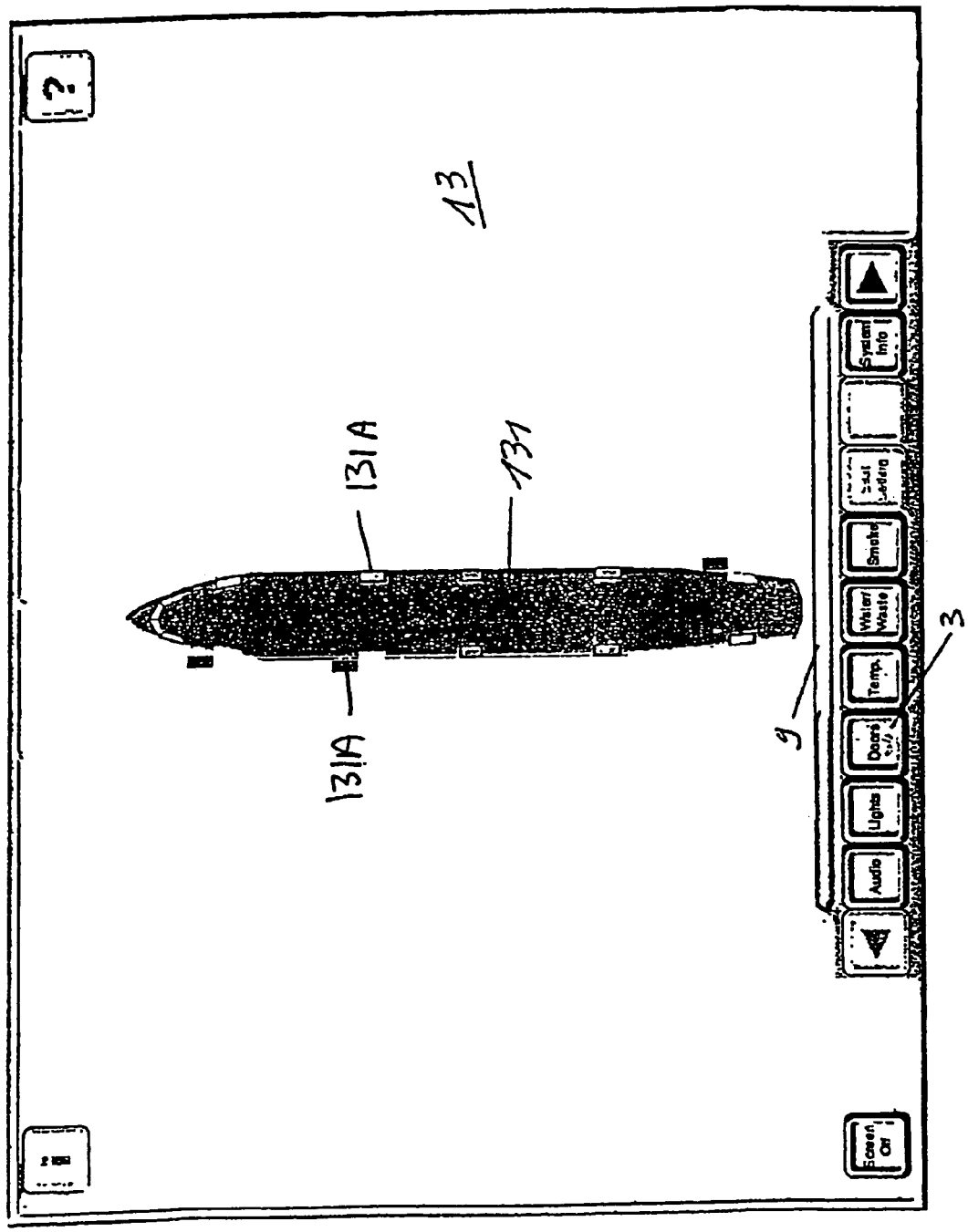
FIG. 7 schematically shows a system menu associated with all aircraft doors of the aircraft.

FIG. 7 shows a system menu 13, which shows the actual present status of all cabin doors and hatches. For example, a graphical aircraft symbol 131 includes a clearly visible graphical indication 131 A of each door, emergency exit hatch, emergency slide, and the like, as well as the respective status thereof. For example, the display or status indication can provide information whether each respective door or hatch is closed or open, pressure-tight or not pressure-tight, locked or unlocked, etc.

Figure 8:
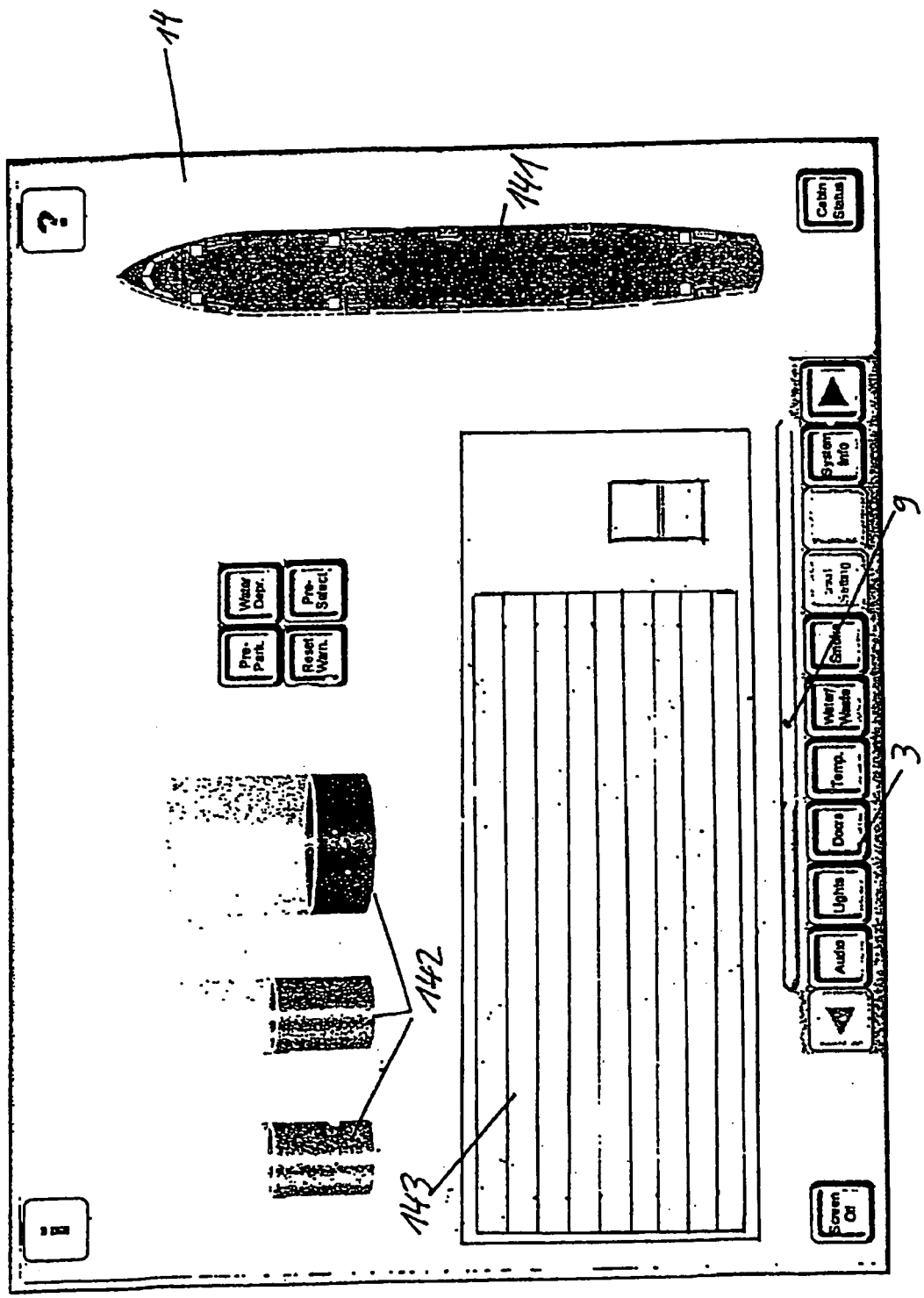
FIG. 8 schematically shows a system menu associated with the water supply and wastewater system of the aircraft.

The system menu 14 shown in FIG. 8 is associated with the water supply and wastewater systems of the aircraft. The system menu 14 includes, on the right side, a graphical aircraft symbol 141, in which the location of each galley and each restroom or toilet is indicated. It is also indicated whether the galley or restroom is properly functional and active, or inactive due to a malfunction or error. In the upper part of the menu 14, graphical images of supply water and wastewater tanks 142 also show the current actual existing water level or volume of water in each tank. Arrows or other indicators can mark prescribed volume values or warning levels or the like. Furthermore, a display screen 143 allows the current actual existing status values of the above mentioned components to be displayed. Input and selection keys can also be provided to allow an operator to control these components.

Figure 9:
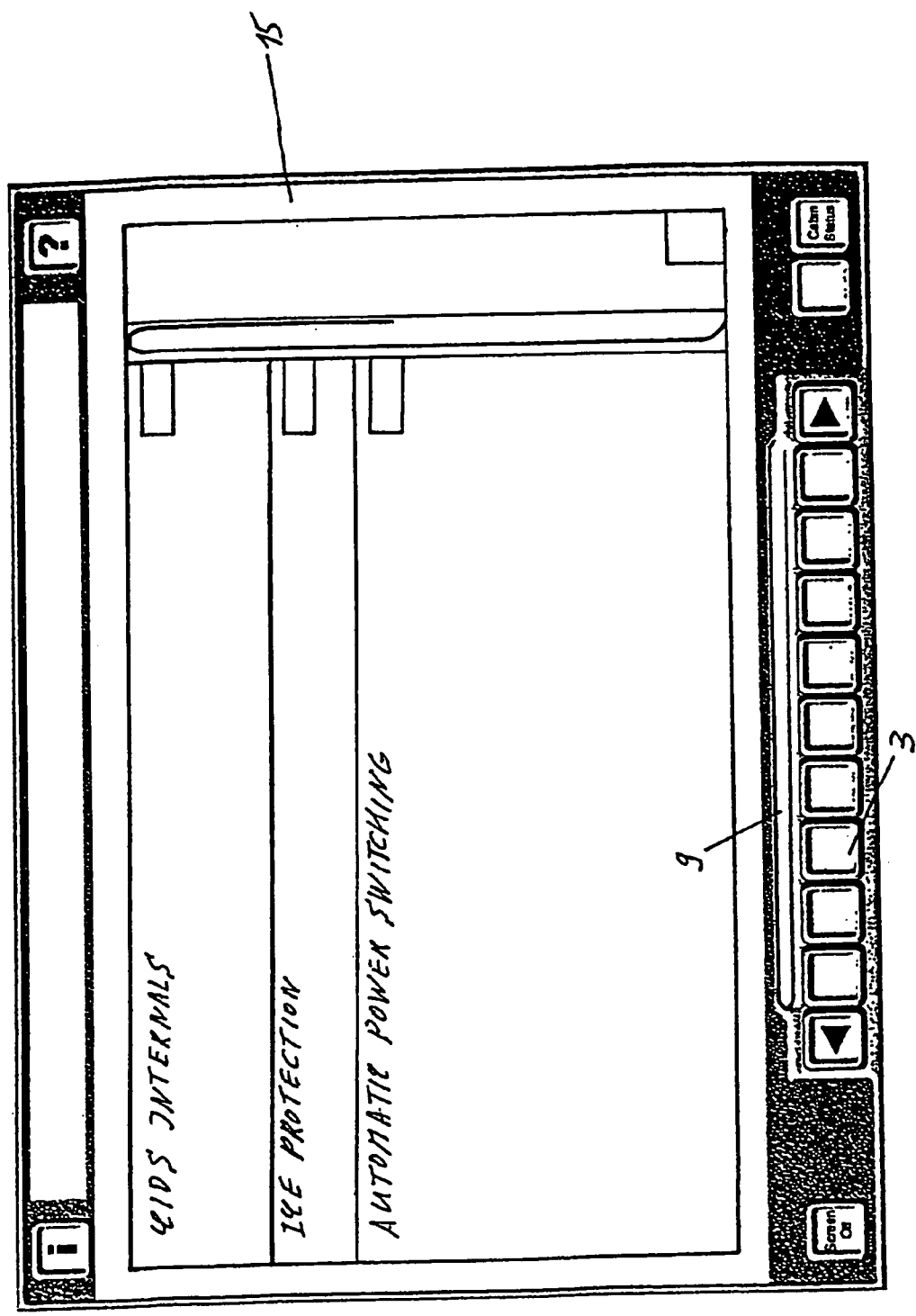
FIG. 9 schematically shows a system menu for indicating the status of all of the cabin systems.

Accordingly to FIG. 9, the inventive apparatus further provides a system menu 15, which displays status values of various cabin systems, and which is preferably called-up before take-off of any flight. An automatic call-up and display of this menu 15 is also advantageous during any flight phase, if the flight crew of the aircraft requires information or status data regarding any of the individual systems. For example, the display can include display fields for status information regarding the cabin intercommunication data system (CIDS), the ice or freeze protection devices, or the electric power supply system. By touching a selection key associated with each respective display field, the operator can then obtain detailed status information regarding the particular selected system.

Figure 10:
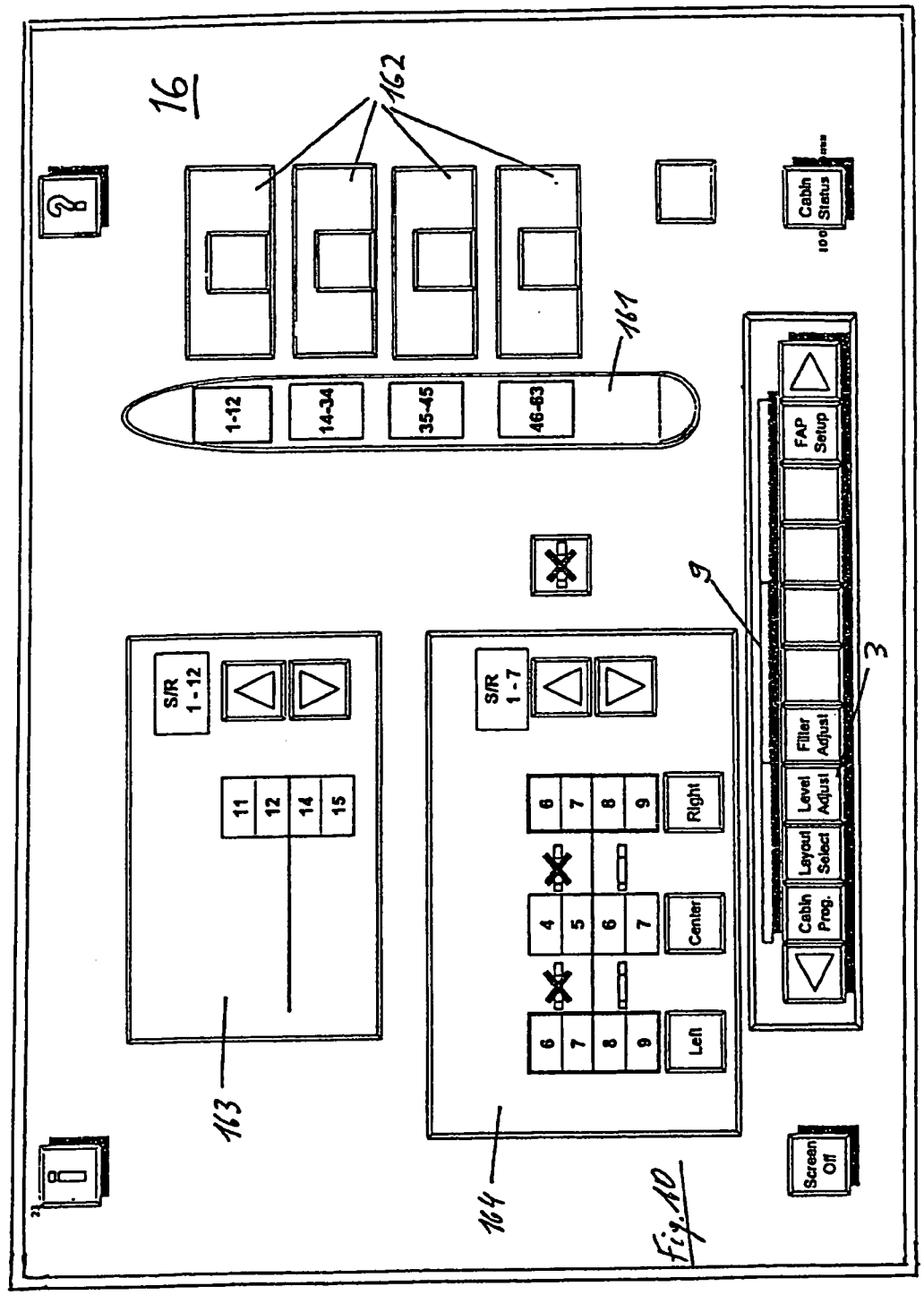
FIG. 10 schematically shows a system menu for programming various functions of the cabin systems.

The system menu 16 shown in FIG. 10 is provided to allow programming of the cabin systems, for example with regard to various parameters in different cabin zones. In the illustrated example, a graphical aircraft symbol 161 shows the several cabin zones, for example in respective seat row ranges or areas, and various touch input key fields 162, 163 and 164 for inputting programming commands for the associated functions in relation to the respective cabin zones or areas. For example, the display and input key field 164 allows a programming of the cabin areas in which smoking will be allowed and those cabin areas in which smoking will not be allowed, e.g. by illuminating the corresponding appropriate smoking or non-smoking indicators in the respective associated cabin areas.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims

The invention claimed is:

1. A method of monitoring and controlling a plurality of aircraft cabin systems using a user interface having a touch sensitive display and a plurality of input keys arranged on a scroll bar and corresponding to the plurality of aircraft cabin systems, the method comprising:

monitoring a subset of the plurality of aircraft cabin systems, selected by the user from among the plurality of aircraft cabin systems, in a main menu that includes a first system image showing status information for a first system of the plurality of aircraft cabin systems, and a second system image showing status information for a second system of the plurality of aircraft cabin systems, wherein at least the first system image is a spatial map of the aircraft cabin showing status information for the first system at different locations within the aircraft cabin;

activating one of said input keys corresponding to a first system of said plurality of aircraft cabin systems to display a first system graphical menu having status information and operating functions of said first system, wherein the first graphical menu can also be displayed by the user touching the first system image spatial map and can also be displayed as part of a predescribed succession plan or display sequence which automatically successively displays system graphical menus corresponding to the plurality of aircraft cabin systems;

touching a touch sensitive input area of said first system graphical menu to perform at least one of selection and control of said operating functions of said first system;

activating another one of said input keys corresponding to a second system of said plurality of aircraft cabin systems to display a second system graphical menu having status information and operating functions of said second system, wherein the second graphical menu can also be displayed by the user touching the second system image and can also be displayed as part of said predescribed succession plan or display sequence which automatically successively displays system graphical menus corresponding to the plurality of aircraft cabin systems;

touching a touch sensitive input area of said second system graphical menu to perform at least one of selection and control of said operating functions of said second system.

2. The method of claim 1, wherein the main menu simultaneously depicts essential information representing system status about at least said first and second systems, said main menu allowing the user to select a desired one of said first and second system menus from said main menu by touching the first or second system image.

3. The method of claim 1, further comprising determining a graphical menu displayed on said display by viewing a header line on the display that identifies which of said graphical menus that is being displayed.

4. The method of claim 1, wherein said plurality of aircraft cabin systems comprise at least two of: a cabin information system, a cabin audio system, a cabin video system, a cabin lighting system, a cabin air conditioning system, a cabin smoke detector system, an aircraft door monitoring system, and a water supply and wastewater system.

5. The method of claim 4, wherein said first system is said cabin audio system, said first system graphical menu is a cabin audio system graphical menu including display indicators and touch sensitive input buttons, said method further comprising monitoring, selecting and playing pre-recorded announcements of said cabin audio system using said audio system graphical menu.

6. The method of claim 5, further comprising activating said touch sensitive input buttons of the cabin audio system graphical menu to select a plurality of pre-recorded announcements to be queued and played in sequence by said audio system.

7. The method of claim 4, wherein said first system is said cabin audio system, said first system graphical menu is a cabin audio system graphical menu including display indicators and touch sensitive input buttons, said method further comprising monitoring and adjusting an on-board music channel of said cabin audio system using said audio system graphical menu.

8. The method of claim 4, wherein said first system is said cabin lighting system, said first system graphical menu is a cabin lighting system graphical menu including display indicators and touch sensitive input buttons, said method further comprising monitoring, selecting and adjusting said cabin lighting system of different areas in an aircraft cabin using said cabin lighting system graphical menu.

9. The method of claim 8, further comprising activating said touch sensitive input buttons to select one of three brightness levels of illumination by said cabin lighting system in cabin entry zones of said aircraft cabin.

10. The method of claim 1, wherein said first cabin system is said aircraft door monitoring system, said first system graphical menu is a cabin door monitoring system graphical menu including display indicators and input buttons, said method further comprising monitoring each door and hatch of the aircraft and determining a respective status thereof using said cabin door monitoring system graphical menu.

11. The method of claim 1, wherein said main menu is a status menu including three or more system images each showing status information for a respective one of said cabin systems.

12. The method of claim 1, wherein each of said first and second system graphical menus simultaneously displays a main menu touch sensitive input key and said plural touch sensitive keys, the method further comprising selecting a touch sensitive key of a system graphical menu to switch to a different system graphical menu, and selecting the main menu touch sensitive input key to switch to the main menu.

13. The method of claim 1, wherein:
the second system image is another spatial map of the aircraft cabin showing status information for the second system at different locations within the aircraft cabin, and
the second graphical menu can also be displayed by the user touching the second system image spatial map.

14. A method of monitoring and controlling a plurality of aircraft cabin systems using a user interface having a touch sensitive display and a plurality of input keys arranged on a scroll bar and corresponding to the plurality of aircraft cabin systems, the method comprising:
monitoring a subset of the plurality of aircraft cabin systems, selected by the user from among the plurality of aircraft cabin systems, in a main menu on said display, said main menu depicting first and second system images showing essential information representing a system status of respective first and second systems of said plurality of aircraft cabin systems, wherein at least the first system image is a spatial map of the aircraft cabin showing status information for the first system at different locations within the aircraft cabin;
activating one of said input keys corresponding to said first system to display a first system graphical menu having status information and operating functions of said first system, wherein the first graphical menu can also be displayed by the user touching the first system image spatial map and can also be displayed as part of a pre-described succession plan or display sequence which automatically successively displays system graphical menus corresponding to the plurality of aircraft cabin systems;
touching a touch sensitive input area of said first system graphical menu to perform at least one of selection and control of said operating functions of said first system;
activating another one of said input keys corresponding to said second system to display a second system graphical menu having status information and operating functions of said second system, wherein the second graphical menu can also be displayed by the user touching the second system image and can also be displayed as part of the predescribed succession plan or display sequence which automatically successively displays system graphical menus corresponding to the plurality of aircraft cabin systems;
touching a touch sensitive input area of said second system graphical menu to perform at least one of selection and control of said operating functions of said second system.

15. The method of claim 14, wherein said monitoring comprises monitoring a main menu that depicts essential information representing a system status of at least two of: a cabin information system, a cabin audio system, a cabin video system, a cabin lighting system, a cabin air conditioning system, a cabin smoke detector system, an aircraft door monitoring system, and a water supply and wastewater system.

16. The method of claim 14, further comprising activating at least one of an area of said touch screen and one of said input keys while one of said graphical menus is displayed in order to return to said main menu.

17. The method of claim 14, further comprising activating at least one of an area of said touch screen and one of said input keys while one of said graphical menus is displayed in order to display a programming menu for programming an aircraft cabin system corresponding to said one of said graphical menus.

18. The method of claim 14 further comprising determining a graphical menu displayed on said display by viewing a header line on the display that identifies which of said graphical menus that is being displayed.

19. The method of claim 14, wherein said main menu is a status menu including three or more system images each showing status information for a respective one of said cabin systems.

20. The method of claim 14, wherein each of said first and second system graphical menus simultaneously displays a main menu touch sensitive input key and said plural touch sensitive keys, the method further comprising selecting a touch sensitive key of a system graphical menu to switch to a different system graphical menu, and selecting the main menu touch sensitive input key to switch to the main menu.

* * * * *